United States Patent
Zaviska et al.

[11] Patent Number: 5,605,385
[45] Date of Patent: Feb. 25, 1997

[54] HYDRAULIC BRAKE SYSTEM WITH BRAKE SLIP AND TRACTION SLIP CONTROL

[75] Inventors: Dalibor Zaviska, Frankfurt am Main; Paul Linhoff, Kelkheim-Eppenhain, both of Germany

[73] Assignee: ITT Automotive Europe GmbH, Frankfurt, Germany

[21] Appl. No.: 313,187

[22] PCT Filed: Jan. 9, 1993

[86] PCT No.: PCT/EP93/00032

§ 371 Date: Oct. 12, 1994

§ 102(e) Date: Oct. 12, 1994

[87] PCT Pub. No.: WO93/21047

PCT Pub. Date: Oct. 28, 1993

[30] Foreign Application Priority Data

Apr. 22, 1992 [DE] Germany .......................... 42 13 199.5

[51] Int. Cl.⁶ .................................................. B60T 8/48
[52] U.S. Cl. ........................................... 303/116.2; 303/11
[58] • Field of Search ........................... 303/10, 11, 113.2, 303/116.1, 116.2

[56] References Cited

U.S. PATENT DOCUMENTS

| | | | |
|---|---|---|---|
| 4,900,105 | 2/1990 | Burgdorf et al. | 303/116.2 |
| 5,213,399 | 5/1993 | Burgdorf et al. | 303/115.4 |
| 5,383,718 | 1/1995 | Burgdorf et al. | 303/113.2 |

FOREIGN PATENT DOCUMENTS

| | | | |
|---|---|---|---|
| 0463355 | 1/1992 | European Pat. Off. | |
| 2658144 | 8/1991 | France. | |
| 2662129 | 11/1991 | France. | |
| 3800854 | 7/1989 | Germany. | |
| 3803363 | 8/1989 | Germany. | |
| 3929464 | 3/1990 | Germany. | |
| 3934624 | 4/1991 | Germany. | |
| 4009640 | 6/1991 | Germany. | |
| 4038033 | 6/1992 | Germany. | |
| 4138027 | 5/1993 | Germany | 303/116.2 |
| 5162627 | 6/1993 | Japan | 303/116.2 |
| 5229412 | 9/1993 | Japan | 303/116.2 |
| 2239913 | 7/1991 | United Kingdom. | |
| 2242245 | 9/1991 | United Kingdom | 303/113.2 |
| 2252373 | 8/1992 | United Kingdom | 303/113.2 |
| 2252599 | 8/1992 | United Kingdom | 303/116.2 |
| 9112162 | 8/1991 | WIPO. | |
| 9118776 | 12/1991 | WIPO. | |
| 9205990 | 4/1992 | WIPO. | |
| 2017356 | 10/1992 | WIPO | 303/116.2 |
| 3000240 | 1/1993 | WIPO | 303/113.2 |

*Primary Examiner*—Josie Ballato
*Attorney, Agent, or Firm*—Ratner & Prestia

[57] ABSTRACT

A brake system arranged for the control both of the brake slip and of the traction slip is presented. In order that during a traction slip control action the brake circuits are rapidly supplied with the required volume of hydraulic pressure fluid at a sufficiently high pressure level, a medium-pressure accumulator is provided which is connected to the suction side of the pump and whose pressure supplied upstream of the pump is higher than the resistances in the brake circuit, in particular higher than the sum of the opening pressures of the suction-side and delivery-side valves of the pump plus the resistance of the wheel brake.

18 Claims, 3 Drawing Sheets

5,605,385

HYDRAULIC BRAKE SYSTEM WITH BRAKE SLIP AND TRACTION SLIP CONTROL

This application is the U.S. national-phase application of PCT International Application No. PCT/EP93/00032.

BACKGROUND OF THE INVENTION

The present invention relates to a hydraulic brake system arranged to control both the brake slip and the traction slip.

A prior art device is disclosed in German patent application published without examination, No. 3,800,854.

The technical background on which the invention is based can be described as follows:

Basically, it is state of the art to prevent an excessive traction slip (i.e. racing of the wheels) by exerting a brake force onto the driven wheels. In this context, the brake torque counteracts the driving torque and reduces it to such an extent that the residual torque is transmitted by the frictional forces between the tires and the roadway.

The brake torque must be variable in order to be able to adjust an optimum traction slip. For this reason, it is proposed to transform those brake systems which provide a brake slip control in such a manner that they permit a traction slip control as well. A basic problem in this transformation is that, at the start of a traction slip control action, the hydraulic pressure fluid must be conducted into the brake circuits in order to build up a brake pressure which will subsequently be varied.

In the event of a brake slip control action, this hydraulic pressure fluid is displaced from the master cylinder into the brake circuits by actuating the master cylinder.

It is known from the prior art to connect the pump, which is provided in the device for the brake slip control, to a reservoir, so that, for the traction slip control, the pump will suck hydraulic pressure fluid from the reservoir and conduct it into the brake circuits. In the event of a traction slip control action at high vehicle speed, however, a sudden pressure build-up will be required which cannot be brought about by such systems without a pressure accumulator. In addition, the brake fluid will be highly viscous during cold weather, so that the pump cannot deliver its full capacity quickly enough.

It has, therefore, been proposed in German patent application published without examination, No. 3,803,363 to provide a high-pressure accumulator on the delivery side of the pump. As a rule, the high-pressure accumulator is dimensioned such that it puts at disposal a volume which is sufficient to fill the wheel brakes of the driven wheels and to generate a pressure in the wheel brakes which safely leads to the wheels failing to race. Depending on the specific brake system, this pressure amounts to approximately 100 bar or more. These prerequisites lead to the accumulator being very large and causing additional cost.

In contrast, it is proposed in the already mentioned German patent application published without examination, No. 3,800,854 to provide an accumulator on the suction side of the pump. This accumulator is actuated by a vacuum receptacle and can be considered a low-pressure accumulator because it brings hydraulic pressure fluid to the suction side of the pump at a comparatively low pressure level, which is then delivered by the latter into the brake circuit. The accumulator, therefore, does not put at disposal the required volume of pressure fluid. The pressure build-up is brought about by the pump. In this set-up, the speed of the pressure build-up depends again on the efficiency of the pump.

It is desirable, therefore, to provide a relatively inexpensive, space-saving brake system which will ensure a sufficiently rapid filling of the wheel cylinders for the traction slip control at high speeds.

SUMMARY OF THE INVENTION

The present invention provides, at the suction side of the pump, a medium-pressure accumulator which is connected to the suction side of the pump through a switch-on valve. The switch-on valve has a first position in which a pressure relief valve becomes effective whose opening pressure determines the maximum pressure of the accumulator. The valve also has a second position in which the connection between the medium-pressure accumulator and the suction side of the pump is opened.

The denomination of the medium-pressure accumulator is to denote that the maximum pressure of this accumulator does not necessarily correspond to that of the high-pressure accumulator according to the state of the art, but that, nevertheless, it puts at disposal a minimum pressure which is higher than that which is supplied by the accumulator according to the German patent application published without examination, No. 3,800,854.

The advantage offered is that an accumulator arranged in this way does not present great size but loads the pump and conducts hydraulic pressure fluid through the suction-side and delivery-side valves of the pump at a speed sufficient to make sure that a rapid pressure build-up will take place in the wheel brake. The pressure which is put at disposal by the medium-pressure accumulator upstream of the pump should, therefore, be higher than the sum of the resistances in the brake circuit; that is, higher than the sum of the opening pressures of the suction-side and delivery-side valves plus the resistances of actuation of the wheel brake.

Since the filling pressure is limited by the opening pressure of the switch-on valve, the noises occurring during the control action, furthermore, are greatly reduced as compared to those of the systems with with a high-pressure accumulator.

The accumulator is loaded by the pump in the phases in which there is no braking operation. Depending on the type of the brake system, the pump is, for this purpose, either steadily connected to a reservoir or connected to a reservoir through a lockable valve. The delivery side of the pump is connected with the medium-pressure accumulator through a pressure relief valve.

The loading procedure can be controlled in different ways.

One possibility is to record the pressure in the medium-pressure accumulator and to cease the loading procedure when a preselected pressure is exceeded. Another possibility is to record the rate of revolutions of the pump, a decrease of the rate of revolutions being interpreted in the sense that the accumulator is sufficiently filled, so that the loading procedure is ended. The simplest possibility is to preselect a determined time interval. If the maximum filling level of the accumulator should be reached before the time interval has elapsed, then further hydraulic pressure fluid will be conducted to the suction side of the pump through the pressure relief valve and switch-on valve.

In case the invention is utilized in connection with a brake system fitted with an anti-locking device which works by the recirculating principle, the low-pressure accumulator accommodating the hydraulic pressure fluid which is let off from the wheel brakes is connected through a non-return valve to the suction side of the pump, so that the medium-pressure accumulator cannot be drained into the low-pressure accumulator.

Such a valve must, of course, be used also if the suction side of the pump is constantly connected to a reservoir,; otherwise the medium-pressure accumulator would be drained into the reservoir.

DETAILED DESCRIPTION OF THE INVENTION

Figure 1:
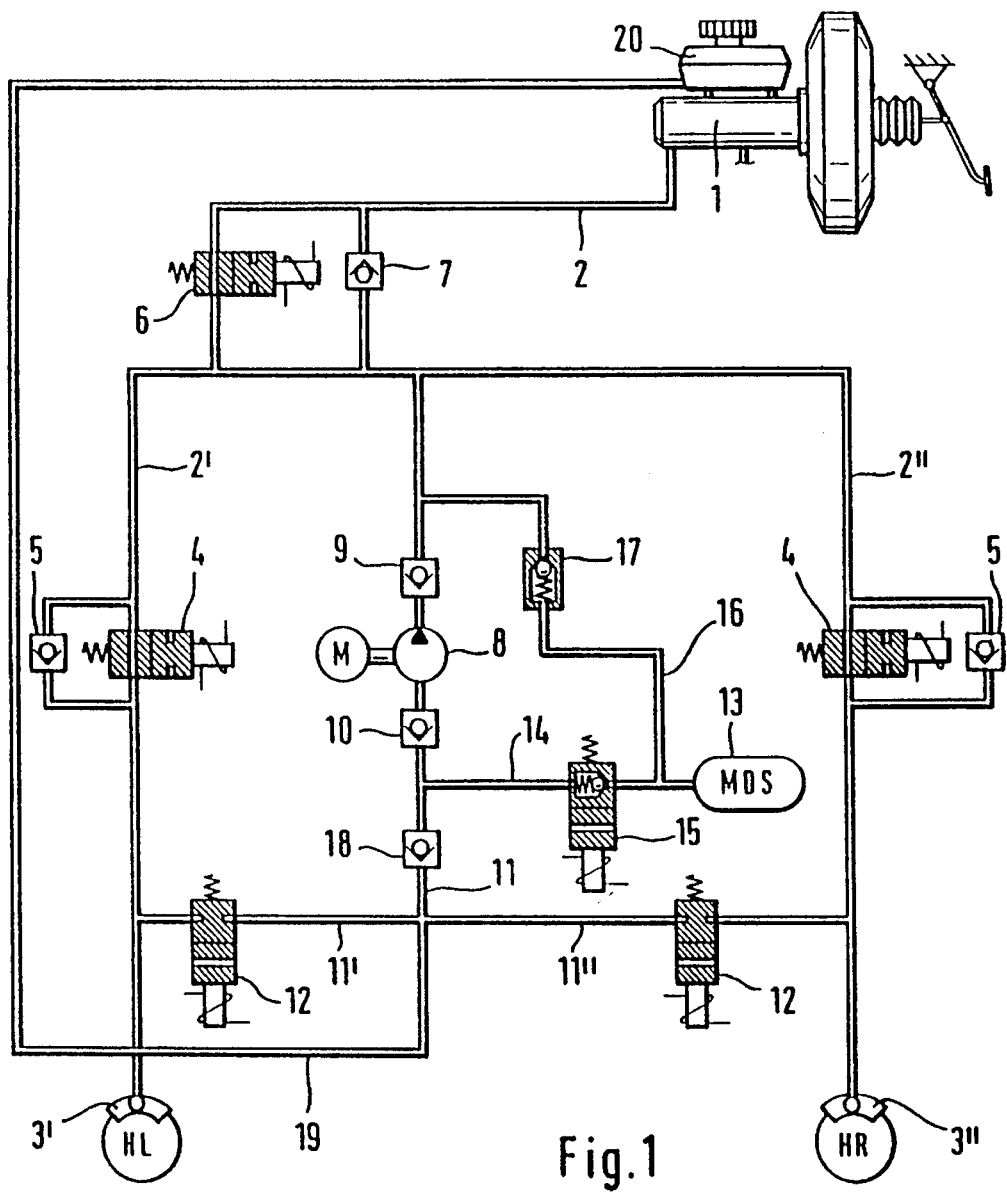
FIG. 1 is a schematic representation of a first embodiment of a hydraulic brake system constructed in accordance with the present invention.

Referring to FIG. 1, the brake system is composed of a master cylinder 1 to which the wheel brakes 3', 3" are connected through a brake piping 2 forming branches (i.e. branch pipings 2', 2"). Only one circuit is illustrated, the driven rear wheels HL, HR being connected to the brake circuit in the embodiment under consideration. In each branch piping, an inlet valve 4 is provided which is actuated electromagnetically. In its normal position, it maintains the branch piping open. If, and when, the valve is switched over, then the branch piping is locked. In parallel with the inlet valves 4 are non-return valves 5 which shut off in the direction of the wheel brake.

In the main brake piping 2, a separating valve 6 is disposed which is normally open and is electromagnetically switched over into the locking position in the event of a traction slip control action. In this instance, too, a non-return valve 7 is connected in parallel to the separating valve 6, which shuts off in the direction of the master cylinder.

Furthermore, a pump 8 is provided having a suction-side valve 10 and a delivery-side valve 9. Customarily, a reciprocating piston pump is utilized, the suction-side valve 10 and delivery-side valve 9 being non-return valves, each of which opens in the delivery direction. In the illustrated embodiment, pump 8 has pump drive M connected thereto.

The suction-side valve 10 of the pump 8 is connected to the wheel brakes 3', 3" through one of the return lines 11' and 11". In these return lines are outlet valves 12 which normally shut off the return line and are brought into an open position electromagnetically.

Furthermore, a medium-pressure accumulator 13 (labeled MDS) is connected through an unloading line 14 to the suction-side valve 10 of the pump 8. In the unloading line 14, a switching valve 15 is inserted which constitutes a pressure relief valve in its normal position whose opening pressure is slightly higher than the maximum pressure of the medium-pressure accumulator 13. In the switching position of the switching valve 15, the unloading line 14 is open.

The medium-pressure accumulator 13 is, moreover, connected to the delivery-side valve 9 of the pump 8 through a loading line 16. In the loading line 16, a pressure relief valve 17 is inserted which limits the pressure at the outlet of the pump 8.

Between the point where the unloading line 14 ends up in the suction line 11 and the outlet valve 12, a non-return valve 18 is disposed which shuts off in the direction of the outlet valve 12.

The embodiment of the invention according to FIG. 1 is furnished with an intake line 19 which is connected to a reservoir 20 and which, between the outlet valve 12 and the non-return valve 18, ends up in the return line 11.

Figure 3:
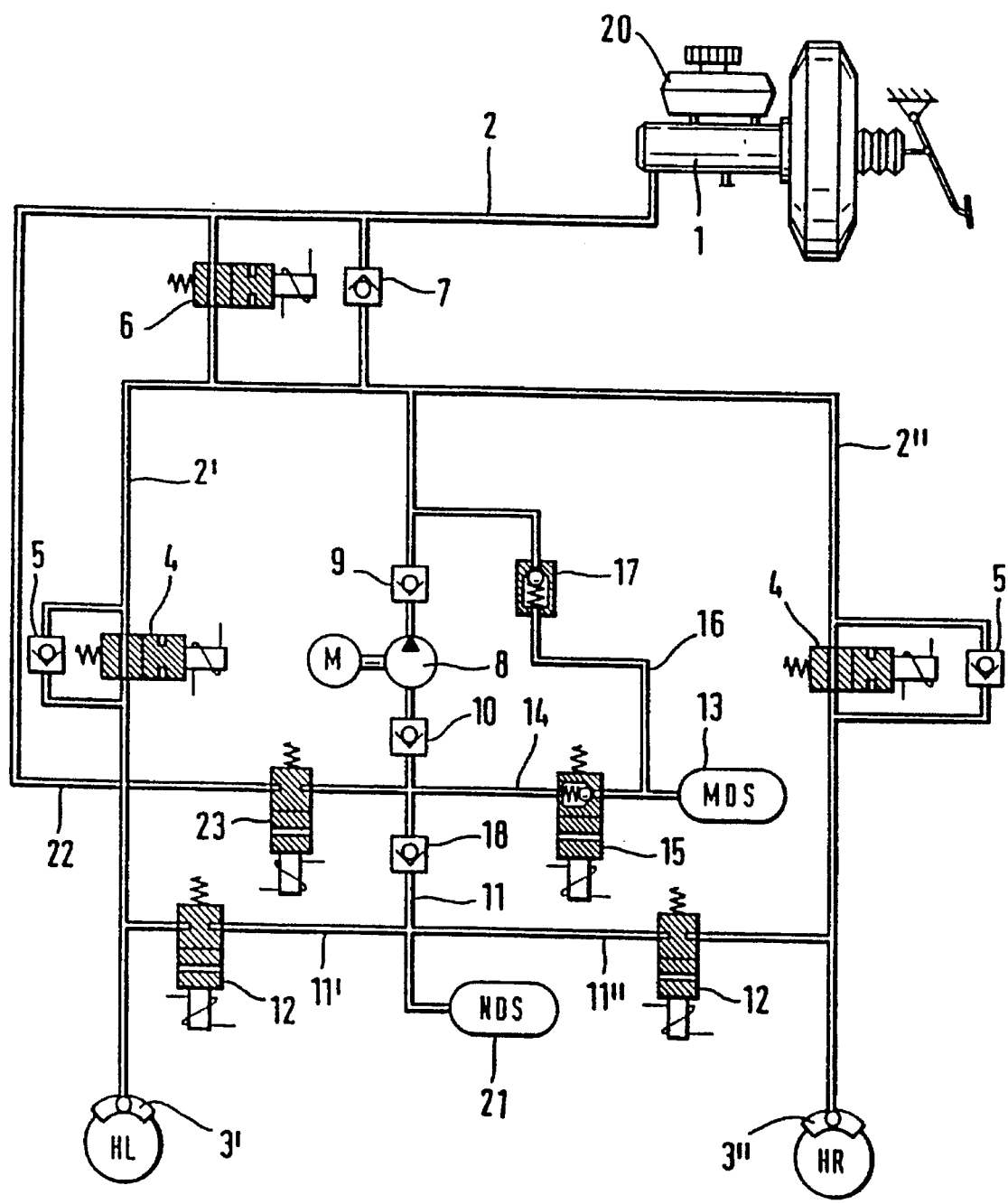
FIG. 3 is a schematic representation of a second embodiment of a hydraulic brake system constructed in accordance with the present invention.

The brake system according to FIG. 3 has a construction similar to the brake system of FIG. 1, with a low-pressure accumulator 21 (labeled NDS) being provided in lieu of a connection of suction line 11 to the reservoir 20.

But in this case, too, there is an intake line 22 which is connected, on one side, to the suction-side valve 10 of the pump 8 and, on the other side, to the master cylinder 1. In the intake line 22, a check valve 23 is arranged which is actuated electromagnetically. In its normal position, it is closed; in its switching position it is open.

Figure 4:
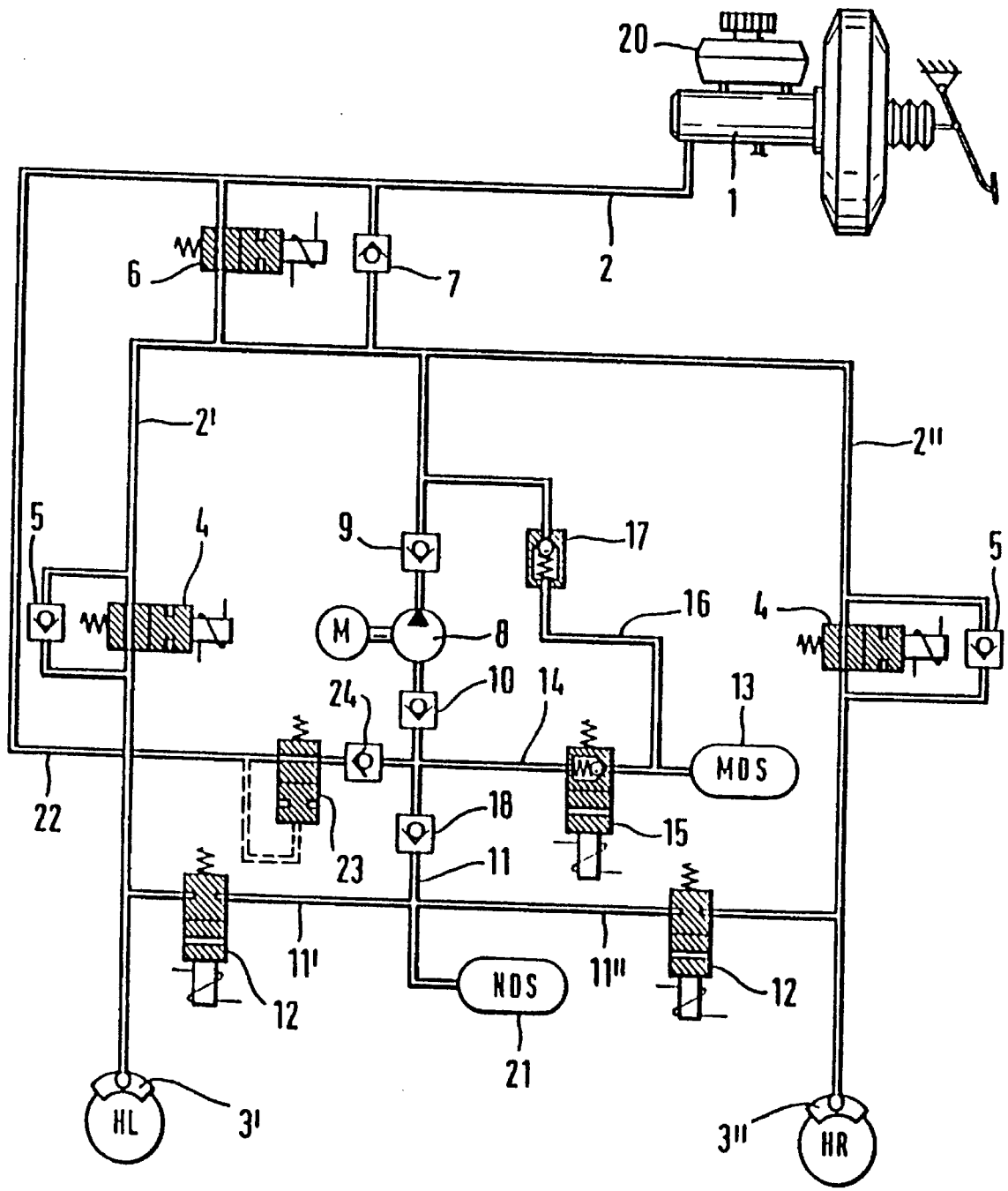
FIG. 4 is a schematic representation of a third embodiment of hydraulic brake system constructed in accordance with the present invention.

According to FIG. 4, check valve 23 may also be actuated hydraulically, and, for that matter, by the pressure in the master cylinder. In this case, however, check valve 23 is succeeded by a non-return valve 24 which shuts off in the direction of the master cylinder. If the check valve is actuated hydraulically, it will reasonably be open in the pressureless condition as illustrated in the drawing. This will be possible because a closing of the valve is safeguarded also in the event of a failure of the current supply and has the advantage that the check valve 23 is actuated at each pedal braking action, as a result precluding cementing together or jamming on account of extended idle times.

Now, the different operating modes can be distinguished.

Normal braking operation:

The hydraulic connections in FIGS. 1, 3 and 4 show the brake system in the normal position. When the pedal is actuated, hydraulic pressure fluid is displaced out of the master cylinder 1 through the open separating valve 6 and through the open inlet valve 4 to the wheel brakes 3', 3". The closed outlet valves 12 prevent delivery of the hydraulic pressure fluid to the reservoir 20, or the low-pressure accumulator 21.

When the pedal is released and the pressure is decreased again, the system works like a conventional system which does not provide any slip control.

Loading operation:

The medium-pressure accumulator 13 must be loaded. This may take place in regular intervals or when a switch not shown in the drawing and positioned at the medium-pressure accumulator records a decrease of the pressure in the accumulator.

Customarily test cycles are provided for the pump in order to check the functioning of the pump. These test cycles may also be utilized for the loading of the medium-pressure accumulator.

The separating valve 6, as well as the inlet valves, must be brought into the closed position in order that a loading procedure can take place. The switching valve 23 is opened. The pump drive is switched in, so that the pump now aspirates directly from the reservoir as illustrated in FIG. 1, or from the master cylinder 1 as shown in FIGS. 3 and 4, the master cylinder being connected to the reservoir 20 because the pedal is not actuated. The non-return valve 24 and the hydraulic check valve 23 according to FIG. 4 open as a result of the pressure on the suction side of the pump decreasing below the atmospheric pressure which exists on the master cylinder side. The hydraulic pressure fluid is conducted through the loading line 16 and the pressure relief valve 17 into the medium-pressure accumulator 13. The loading procedure is ended as soon as the accumulator is filled, or one of the criteria is fulfilled which are mentioned above in the introduction to the description.

Brake slip control operation:

By means of sensors which are not shown in the drawing, the rotational behavior of the wheels to be braked is continuously monitored, so that by means of an electronic evaluating unit (also not shown in the drawing), the tendency for one of the wheels to be locked can be detected. In that case, the system will switch over into the brake slip control mode and the pump will be switched in. By opening and closing of the inlet valves and outlet valves 4 and 12, hydraulic pressure fluid may now be let off into the reservoir 20 in accordance with FIG. 1, so that the pressure in the wheel brake will be decreased, or, hydraulic pressure fluid may be conducted by means of the pump 8 to the wheel brakes 3', 3", so that the pressure in the wheel brakes will rise. The pressure build-up and decrease depend on the signals which are supplied by the wheel sensors. It will, therefore, be possible to adjust an optimum brake slip which also permits transmitting the lateral guiding forces. The valve 15 remains in its locking position, so that the medium-pressure accumulator 13 is not involved in a brake slip control action. The check valve 23 remains closed during a brake slip control action, or is switched into the locking position by the pressure in the master cylinder, so that, according to FIGS. 3 and 4, a closed brake circuit exists and the system will work according to the recirculating principle.

Traction slip control operation:

By means of the sensors already mentioned above, the traction slip of the driven wheels during starting also may be detected. If, and when, one of the driven wheels tends to race, then the system switches into the traction slip control mode. The separating valve 6 is brought into the closed position and the switch-on valve 15 opens. Simultaneously, the pump drive is switched in. The check valve 23 may be opened if necessary. In the initial phase of the control action, first the medium-pressure accumulator 13 will be drained, and its volume will be conducted through the suction-side valve 10 and the delivery-side valve 9 of the pump 8 and through the open inlet valve 4 to the wheel brakes 3', 3". A rapid pressure build-up will take place, which is assisted by the pump 8 starting to run. The pressure control will now be carried out by closing and opening of the inlet and outlet valves in a similar manner as in the event of a brake slip control action.

It is essential that the medium-pressure accumulator 13, on one hand, puts at disposal a volume which is sufficient to fill the wheel brakes 3' and 3", and furthermore generates an input pressure for the pump 8, so that the latter will rapidly reach its full delivery rate and that simultaneously the delivery rate of the pump is overlayed by the unloading capacity of the medium-pressure accumulator 13.

Figure 2:
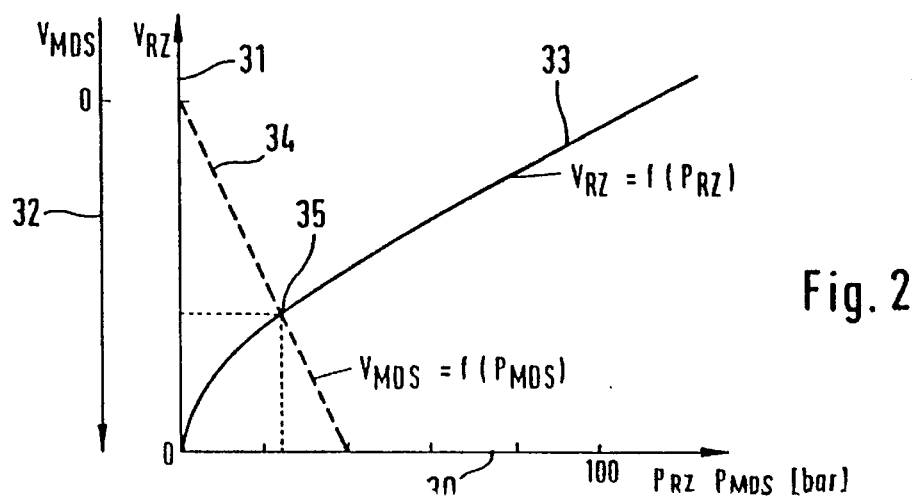
FIG. 2 is a graph showing the unloading curve of the medium-pressure accumulator in conjunction with the absorption of volume on the part of the brake system.

This is illustrated in the graph of FIG. 2. On the X axis 30, the wheel cylinder pressure PRZ, and the pressure of the medium-pressure accumulator PMDS are plotted. On the Y axis 31, the volume absorption of the wheel cylinder VRZ is plotted.

Parallel to axis 31 is an axis 32 which denotes the loading condition of the medium-pressure accumulator. At least in the closed system, the loading condition VMDS of the medium-pressure accumulator is reciprocal to the loading condition of the wheel brakes; that is, when the medium-pressure accumulator is in the filled condition, the wheel brakes will be empty and vice versa.

The curve of the volume absorption by the wheel brake is illustrated in the shape of a continuous line 33. This curve corresponds, by and large, to a parabola, at the brake pressure zero, no volume existing in the wheel brake. As the brake pressure increases, the volume absorption of the wheel brake, too, increases. These curves are developed empirically and depend on the type of wheel brake. The dashed line 34 shows the relationship between the absorption of volume of the medium-pressure accumulator and the accumulator pressure. When the accumulator is entirely filled (auxiliary axis 32), a pressure of 40 bar will come about according to the embodiment under review. The pressure will decrease linearly and will be zero when the medium-pressure accumulator has been emptied (zero mark on the auxiliary axis 32).

When at the beginning of a traction slip control action, the medium-pressure accumulator is being emptied because the switching valve 15 opens, then the pressure in the medium-pressure accumulator will decrease in accordance with the dashed center line, whereby the medium-pressure accumulator will simultaneously be emptied.

The quantity of hydraulic pressure fluid which originates from the medium-pressure accumulator enters the wheel brake, with the result that a pressure builds up in accordance with the line 33 until a pressure balance will come about in the point 35.

We claim:

1. A hydraulic brake system with a device to control both brake slip and traction slip, a master cylinder to which a brake circuit is connected which can be separated from said master cylinder by means of separating valve, said brake circuit being comprised of wheel brakes for wheels driven by a vehicle engine and of valves for the control of pressure in the wheel brakes depending on sensors which monitor rotational behavior of the wheels, furthermore of a pump which delivers hydraulic pressure agent into said brake circuit, and of an accumulator which is connected to a suction side of said pump, a switch-on valve being provided in a connecting line, characterized in that said accumulator is a medium-pressure accumulator with a pressure put at disposal upstream of said pump which is higher than resistances in said brake circuit.

2. A hydraulic brake system as claimed in claim 1, characterized in that in a locking position said switch-on valve provides a pressure relief valve which determines a maximum filling pressure of said medium-pressure accumulator.

3. A hydraulic brake system as claimed in claim 1 characterized in that said medium-pressure accumulator is connectible through a pressure relief valve to a delivery side of said pump and in that the suction side of said pump is in connection with a reservoir.

4. A hydraulic brake system as claimed in claim 3, characterized in that in the connection between the suction side of said pump and said reservoir an electromagnetically actuatable check valve, closed when de-energized, is inserted.

5. A hydraulic brake system as claimed in claim 3, characterized in that in said connection between the suction side of said pump and said reservoir a check valve is inserted which is acutable hydraulically by the pressure in the master cylinder and which is opened in a pressureless condition.

6. A hydraulic brake system as claimed in claim 1, characterized in that a non-return valve arrangement allows an unloading of said medium-pressure accumulator exclusively in a delivery direction of said pump.

7. A hydraulic brake system for controlling brake slip and traction slip in a vehicle having an engine, a plurality of wheels driven by the engine, sensors for monitoring rotational behavior of the wheels, and a controller responsive to the sensors for detecting a tendency of brake slip or traction slip of one of the wheels, said brake system comprising:

a master cylinder for supplying hydraulic pressure fluid;

a plurality of wheel brakes actuated by the hydraulic pressure fluid;

a brake circuit including:
  (a) inlet valves responsive to the controller for controlling delivery of hydraulic pressure fluid to said wheel brakes, and
  (b) outlet valves responsive to the controller for controlling delivery of hydraulic pressure fluid from said wheel brakes;

a separating valve between said master cylinder and said brake circuit and responsive to the controller for connecting said brake circuit to said master cylinder during normal braking and for disconnecting said brake circuit from said master cylinder during traction slip control;

a pump responsive to the controller and having a suction side and a delivery side for delivering hydraulic pressure fluid to said brake circuit during traction slip control;

a first connecting line extending from said delivery side of said pump;

a second connecting line extending from said suction side of said pump;

a delivery-side valve in said first connecting line;

a suction-side valve in said second connecting line;

an accumulator for:
  (a) receiving hydraulic pressure fluid through said first connecting line,
  (b) delivering hydraulic pressure fluid through said second connecting line, and
  (c) containing hydraulic pressure fluid at a pressure higher than the sum of:
    (1) opening pressures of said suction-side valve and said delivery-side valve, and
    (2) pressure required to actuate said wheel brakes; and a switch-on valve in said second connecting line responsive to the controller for selectively connecting said accumulator to said pump.

8. A hydraulic brake system as claimed in claim 7, wherein said switch-on valve has a locking position in which said switch-on valve is a pressure relief valve adapted to determine a maximum pressure of said accumulator.

9. A hydraulic brake system as claimed in claim 8 further comprising a reservoir for containing hydraulic pressure fluid connected to said suction-side valve.

10. A hydraulic brake system as claimed in claim 9 further comprising a non-return valve between said reservoir and said switch-on valve and between said outlet valves and said switch-on valve to allow delivery of the hydraulic pressure fluid from said accumulator only through said pump.

11. A hydraulic brake system as claimed in claim 10, further comprising a pressure relief valve disposed in said first connecting line between said accumulator and said delivery-side valve.

12. A hydraulic brake system as claimed in claim 8 further comprising means for connecting said master cylinder to said suction-side valve.

13. A hydraulic brake system as claimed in claim 12 further comprising an electromagnetically actuated check valve disposed between said suction-side valve and said master cylinder to control delivery of hydraulic pressure fluid from said master cylinder to said accumulator through said pump to accumulate hydraulic pressure fluid in said accumulator.

14. A hydraulic brake system as claimed in claim 13 further comprising a non-return valve between said switch-on valve and said outlet valves to allow delivery of the hydraulic pressure fluid from said accumulator only through said pump.

15. A hydraulic brake system as claimed in claim 14, further comprising a pressure relief valve disposed in said first connecting line between said accumulator and said delivery-side valve.

16. A hydraulic brake system as claimed in claim 12 further comprising a check valve disposed between said suction-side valve and said master cylinder and actuated hydraulically by the hydraulic pressure fluid in said master cylinder to control delivery of hydraulic pressure fluid from said master cylinder to said accumulator through said pump to accumulate hydraulic pressure fluid in said accumulator.

17. A hydraulic brake system as claimed in claim 16 further comprising:
  (a) a first non-return valve between said switch-on valve and said outlet valves, and
  (b) a second non-return valve between said switch-on valve and said check valve to allow delivery of the hydraulic pressure fluid from said accumulator only through said pump.

18. A hydraulic brake system as claimed in claim 17, further comprising a pressure relief valve disposed in said first connecting line between said accumulator and said delivery-side valve.

* * * * *

UNITED STATES PATENT AND TRADE MARK OFFICE
CERTIFICATE OF CORRECTION

PATENT NO. : 5,605,385
DATED : February 25, 1997
INVENTOR(S) : Dalibor Zaviska et al.

It is certified that error appears in the above-identified patent and that said Letters Patent is hereby corrected as shown below:

In Column 8, claim 17, line 47, the words "to allow delivery of the" should begin a new line at the margin.

Signed and Sealed this

Fifteenth Day of July, 1997

Attest:

BRUCE LEHMAN

Attesting Officer

Commissioner of Patents and Trademarks